A. EMRICH.
CIGAR CUTTER.
APPLICATION FILED JUNE 20, 1913.
Reissued Feb. 2, 1915. 13,873.
Fig. 1.
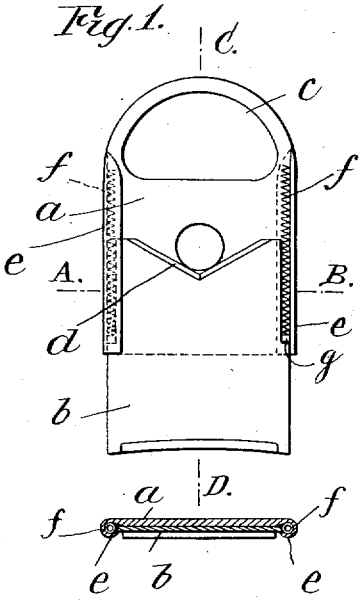
Fig. 3.
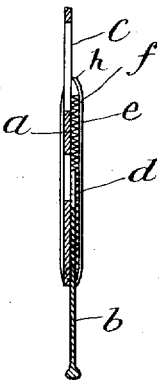
Fig. 2.
Fig. 4.
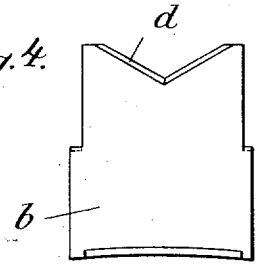
Fig. 5.
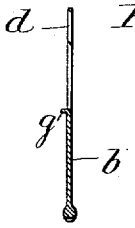
Witnesses
John Murtagh
F. Hogg
Inventor
Alfred Emrich
by Goepel & Goepel Attorneys.
THE NORRIS PETERS CO., PHOTO-LITHO., WASHINGTON, D. C.

UNITED STATES PATENT OFFICE.

ALFRED EMRICH, OF PFORZHEIM, GERMANY, ASSIGNOR, BY MESNE ASSIGNMENTS, TO SHIMAN-MILLER MANUFACTURING COMPANY, A CORPORATION OF NEW YORK.

CIGAR-CUTTER.

13,873. Specification of Reissued Letters Patent. Reissued Feb. 2, 1915.

Original No. 958,610, dated May 17, 1910, Serial No. 514,587. Application for reissue filed June 20, 1913. Serial No. 774,943.

*To all whom it may concern:*

Be it known that I, ALFRED EMRICH, a citizen of Germany, residing in Pforzheim, Baden, Germany, have invented certain new and useful Improvements in Cigar-Cutters, of which the following is a specification.

This invention relates to cigar cutters and particularly to those consisting of two plates sliding one over the other, one of said plates surrounding the edges of the other like rolls, and one of them being perforated to admit the tip of the cigar, while the other forms the blade for cutting off the tip. Such cutters are, however, attended with the drawback that the plates must be returned by hand into their normal or working position, although it has been proposed to provide cigar cutters of other types with springs for this purpose.

According to this invention springs are disposed in the hollows of said rolls whereby the advantages of springs in the flat form of cutter are obtained.

One method of carrying out the subject of the invention is shown as a typical example in the drawing.

Figure 1 is an elevation partly in section. Fig. 2 is a section along A—B and Fig. 3 is a section along C—D of Fig. 1. Fig. 4 is an elevation of the cutting plate and Fig. 5 is a section of the same.

The cigar cutter consists of the plates *a*, *b*, the former of which is pierced for the insertion of the cigar tip and is provided with an opening *c* for the finger, while the second plate is provided with a recess *d* which is shaped into a blade for cutting off the tip of the cigar. When in position for use these plates partially overlap but only to such an extent that the hole in the plate *a* remains uncovered. The plate *a* is provided with lateral guides *e* for the plate *b*. The edges of the plate *a* are of less thickness than the remaining part of the latter and bent so as to form lateral guides *e* for the plate *b*. Therefore both plates can be pushed together telescopically, and will then cut off a cigar tip that is projecting through the hole in the plate *a*.

In order that after each time of using, the cigar cutter may return automatically into position for use over again, a spiral spring *f* is provided in each of the lateral grooves *e* of the plate *a*, of which the one end is supported by a shoulder *g* of the plate *b*, while the other end is held by suitably bending up the extremity *h* of the bent edges *e*. The spring *f* causes the plate *b* to spring back as soon as the pressure that caused the plates to slide over each other is removed.

In using the cigar cutter, all that is necessary is to press on the outer ends of the two plates, so that the cutting edge of the one plate slides across the opening in the other plate, and thus cuts off the cigar tip inserted therein. When this pressure is released, the two plates return at once into position for use, so that the cutter is ready for cutting off the next tip. Of course it is not essential that spiral springs should be inserted between the two plates, springs of other shape, or other elastic means being also applicable.

I claim:

1. In a cigar cutter, the combination with a flat plate provided with a finger hole and also perforated to receive the end of cigar, and provided with flanged sides folded over to form grooves, of a second flat plate provided with V shaped cutting edges and having its sides engaging in said grooves and extending inwardly thereof, with lugs projecting from said sides, and coil springs mounted in said grooves and between the first and second plates and engaging said lugs, said springs normally restoring said second plate to the initial operative position, substantially as described.

2. In a cigar cutter, the combination with a flat plate provided with flanged sides folded over to form grooves, of a second plate having its sides engaging in said grooves, and extending inwardly thereof, and having lugs projecting from said sides, and coil springs in said grooves and between the first and second plates, and engaging said lugs, said springs normally restoring said second plate to the initial operative position, the said plates being provided respectively with a perforation to receive the end of a cigar and with a cutting edge, and one of said plates being provided with a finger-hole.

3. In a cigar cutter, the combination with a flat plate provided with flanged sides folded over to form grooves, contracted at each end, of a second flat plate having its sides engaging in said grooves, lugs projecting from said sides of said second plate, and coil springs mounted in said grooves, having one end thereof at one of the contracted ends of the grooves, and arranged between the first and second plates, and having the other ends of the coil springs engaged by the lugs of the other plate, and springs normally restoring the plates to the initial operative position, the said plates being provided respectively with a perforation to receive the end of a cigar and with a cutting edge, and one of said plates being provided with a finger-hole.

In testimony that I claim the foregoing as my invention, I have signed my name in the presence of two witnesses, this 24th day of April 1913.

ALFRED EMRICH.

Witnesses:
ABRAHAM SHERMAN,
JOHN MURTAGH.

Copies of this patent may be obtained for five cents each, by addressing the "Commissioner of Patents, Washington, D. C."